United States Patent
Otterstedt

(10) Patent No.: US 11,679,984 B2
(45) Date of Patent: Jun. 20, 2023

(54) COMPOSITE SOLS

(71) Applicant: Prebona AB, Simrishamn (SE)

(72) Inventor: Jan-Erik Otterstedt, Simrishamn (SE)

(73) Assignee: PREBONA AB, Simrishamn (SE)

( * ) Notice: Subject to any disclaimer, the term of this patent is extended or adjusted under 35 U.S.C. 154(b) by 139 days.

(21) Appl. No.: 16/306,979

(22) PCT Filed: Jun. 15, 2017

(86) PCT No.: PCT/EP2017/064658
§ 371 (c)(1),
(2) Date: Dec. 4, 2018

(87) PCT Pub. No.: WO2017/216285
PCT Pub. Date: Dec. 21, 2017

(65) Prior Publication Data
US 2020/0239322 A1    Jul. 30, 2020

(30) Foreign Application Priority Data

Jun. 15, 2016 (EP) ..................................... 16174645

(51) Int. Cl.
*C01B 33/149* (2006.01)
*A01N 25/04* (2006.01)
*A01N 59/20* (2006.01)

(52) U.S. Cl.
CPC ............ *C01B 33/149* (2013.01); *A01N 25/04* (2013.01); *A01N 59/20* (2013.01); *C01P 2004/61* (2013.01)

(58) Field of Classification Search
CPC ..... C01B 33/149; C01B 33/146; C01B 33/14; A01N 25/04; A01N 59/20; C01P 2004/61
See application file for complete search history.

(56) References Cited

U.S. PATENT DOCUMENTS

| | | |
|---|---|---|
| 2003/0203009 A1 | 10/2003 | MacDonald |
| 2005/0084632 A1 | 4/2005 | Urlaub et al. |
| 2008/0145269 A1 | 6/2008 | Martin et al. |
| 2010/0311871 A1* | 12/2010 | Suemura ............... C01B 33/146 427/217 |

FOREIGN PATENT DOCUMENTS

| | | |
|---|---|---|
| CN | 102066252 A | 5/2011 |
| EP | 2 251 304 A1 | 11/2010 |
| WO | 2011/037523 A1 | 3/2011 |

OTHER PUBLICATIONS

Matijevic Stability of Colloidal Silica, J. of Colloid and Interface Sci. V.35, p. 560 (Year: 1971).*
Silva Actinide Environ. Chem. Radiochimica Acta p. 377 (Year: 1995).*
International Search Report received in corresponding International Application No. PCT/EP2017/064658 dated Aug. 2, 2017.
Written Opinion of the International Searching Authority received in corresponding International Application No. PCT/EP2017/064658 dated Aug. 2, 2017.
Zeta Potential Analysis of Antiparticles, nanoComposix, Sep. 2012, V 1.1. San Diego, California.
Research of Cultural Relics, edited by editorial department of Research of Cultural Relics, p. 234, Huangshan Publishing House, 20000930 with partial English summary.
English translation of First Chinese Office Action corresponding with Chinese Application No. 201780037140.8 dated Nov. 29, 2021.
Zeta Potential Analysis of Nanoparticles, nanoComposix, Sep. 2012, V 1.1. San Diego, California.

* cited by examiner

*Primary Examiner* — Matthew P Coughlin
*Assistant Examiner* — Thurman Wheeler
(74) *Attorney, Agent, or Firm* — Renner, Otto, Boisselle & Sklar, LLP

(57) ABSTRACT

A colloidal dispersion of particles of silica having a particle size of from 3 nm to 100 nm, to which ions of one or more metals are adsorbed, selected from metals having atomic numbers 21-31, 39-46, 48-50, 57-82, and 89-93, and a method for preparing the dispersion. The dispersion may be used in various fields of use of metals.

16 Claims, No Drawings

COMPOSITE SOLS

This application is a national phase of International Application No. PCT/EP2017/064658 filed Jun. 15, 2017, and claims priority to European Application No. 16174645.8 filed on Jun. 15, 2016, which is incorporated herein by reference.

FIELD OF THE INVENTION

The present invention relates to colloidal sols containing metal ions, in particular multivalent metal ions. More particularly, it relates to such materials comprising silica nanoparticles to which metal ions, e.g. multivalent metal ions have been adsorbed. It also relates to processes for making such materials and using them in different applications, e.g. applications where biocidal or other effects are desired.

BACKGROUND AND PRIOR ART

Nanotechnologies are the science and business of manipulating matter at the atomic scale. Materials produced with the aid of various kinds of nanotechnologies are starting to be used in many areas of everyday life such as cosmetics, clothing fabrics, sports equipment, paints, packaging, food, etc. and have been used for some time as for instance catalysts in many important industrial processes. In the future we will no doubt see many more application of nanomaterials in general and of nanomaterials involving transition metals in particular.

Transition metal ions and copper ions, either alone or in copper complexes, in particular, have been used to disinfect liquids, solids and human tissue for centuries. Today, copper is used as a water purifier, algaecide, fungicide, nematocide, molluscicide as well as an anti-bacterial and anti-fouling agent. Copper also displays potent anti-viral activity.

Complexes of divalent transition metals like Ni(II), Co(II), Cu(II) and Zn(II), as well as lanthanide ions, with Schiff's base ligands have been shown to possess bactericidal and/or fungicidal activities.

Prior art describes the preparation and use of colloidal forms of transition metals, for instance colloidal silver and copper, as biocides in various applications. Particle size and particle size distribution are often described as important properties of such colloidal dispersions although their values are rarely specified. In some prior art it is stated that it is desirable that at least 50% of the particles have a particle size smaller than 15 nanometers. When nano-particles of noble metals are used as biocides, or to provide other functions, only the metal atoms at the surface of the particles are able to come into contact and interact with microbes or different kinds or with reactants to provide antimicrobial effect or e.g. to promote the formation of products. Metal atoms in the interior of the particles have no access to the environment outside of the particles and therefore have no biocidal—or other—activity. Let $n_s$ and $n_t$ denote the number of surface atoms and the total number of atoms, for instance noble metal atoms, respectively. The ratio $n_s/n_t$ is called the degree of dispersion of the noble metal and is a very important property of noble metals in application, for instance many catalytic applications or biocidal applications, where their performance depend on the number of atoms they expose to their environment. The degree of dispersion decreases rapidly with particle size. In the case of, for instance, nano-particles of silver, the degree of dispersion thus decreases from about 85% to about 30% when the particle size grows from 1 nanometer to 5 nanometers. The degree of dispersion of 15 nanometer particles is less than 10%, indicating that more than 90% of the metal reside inactive in the interior of the particles.

WO 2011/037523 discloses stable colloidal dispersions comprising carrier particles of silica to which the monovalent ion $Ag^+$ has been adsorbed.

US20050084632 (Uriaub et al) describes a method for neutralizing odor contained within the headspace of a product packaging comprising the step of formulating a blend of differently modified high surface area materials, which may be in the form of aqueous dispersions of for instance silica particles on the surface of which $Cu^{2+}$ or $Ag^+$ ions may be adsorbed. The content of cupric or silver ions, however, is very low. Moreover, the dispersions described in US20050084632 are instable towards gelling, as shown by the very low (in absolute value) Z-potential of between −5 and −20 millivolts indicated for the material of US20050084632.

Coagulation is a process which involves aggregation of colloidal particles into larger sized particles which ultimately may settle as a precipitate or float on the surface. Coagulation is generally brought about by the addition of electrolytes. When an electrolyte is added to a colloidal solution, the particles of the sol take up the ions which are oppositely charged and thus the surface charge is neutralized, which promotes particle aggregation.

The quantity of the electrolyte which is required to coagulate (flocculate) a definite amount of a colloidal solution depends mainly upon the valency of the ion having a charge opposite to that of the colloidal particles, and much less on the actual ion. This observation of Hardy and Schulze is known as Hardy Schulze law, the Schulze-Hardy rule etc, which states that the greater is the valency of the oppositely charged ion of the electrolyte being added, the faster is the coagulation. The efficiencies of various electrolytes in destabilizing a given sol may be expressed in terms of $c_{crit}$, which is the minimum concentration of a particular electrolyte required to produce rapid coagulation of a colloidal particle dispersion. The dependence between the counter ion valence and $c_{crit}$ can be derived from the well established and generally recognized DLVO theory, which explains the aggregation of aqueous dispersions quantitatively and describes the force between charged surfaces interacting through a liquid medium. According to this theory, $c_{crit}$ is inversely proportional to the sixth power of the valence z of an ion, viz.

$$c_{crit} = \frac{\text{constant}}{z^6}.$$

The implication is that the minimum concentration required of a divalent ion to produce flocculation of a colloidal particle dispersion is $2^6=64$ times lower than the minimum concentration of a monovalent ion, whereas the minimum concentration required of a trivalent ion is $3^6=729$ times lower than that of a monovalent ion. This flocculating power of multivalent ions is a well-known feature, which has been used, e.g. in the treatment of sewage water.

It further is well known that many metals, e.g. most transition metals, have a very low solubility in aqueous solutions of basic pH. In Table 1, the aqueous solubility of some metal hydroxides at a temperature of 20° C. is shown.

TABLE 1

Aqueous solubility of some metal hydroxides at 20° C.

| Metal hydroxide | Aqueous solubility (M) |
|---|---|
| AgOH | $2.0 \times 10^{-4}$ |
| Cd(OH)$_2$ | $1.8 \times 10^{-5}$ |
| Co(OH)$_2$ | $3.4 \times 10^{-5}$ |
| Cu(OH)$_2$ | $1.7 \times 10^{-7}$ |
| Fe(OH)$_2$ | $5.8 \times 10^{-6}$ |
| Fe(OH)$_3$ | $2.0 \times 10^{-10}$ |
| Gd(OH)$_3$ | $5.2 \times 10^{-7}$ |
| Pb(OH)$_2$ | $6.7 \times 10^{-6}$ |

As may be seen from Table 1, while the solubility of silver hydroxide is very low, that of many other multivalent metals, in particular many multivalent transition metals, is even lower. Thus, if an alkali, such as sodium hydroxide, is added to a solution containing even a very low concentration of, say, a copper salt, precipitation of $Cu(OH)_2$ will occur very rapidly.

It however is well known that many metals, e.g. transition metals such as copper, chromium and zinc, as well as lanthanide metals, such as gadolinium, have various useful properties, e.g. biocidal, catalytic or magnetic properties. There therefore is a need for improved formulations of such metals that combine high activity with the excellent non-leachability of nano-particles and the perfect dispersion of ions. Furthermore, very advantageously such formulations could provide a means to obtain a given effect, e.g. a biocidal effect, a catalytic effect, or any other desired effect, by use of a reduced amount of metal.

SUMMARY OF THE INVENTION

A first aspect relates to a stable colloidal dispersion comprising silica nanoparticles and multivalent metal ions.

Thus, provided herein is a colloidal dispersion of particles of silica having a particle size of from 3 nm to 100 nm, said particles carrying ions of one or more metals at the particle surface, selected from metals having atomic numbers 21-31, 39-46, 48-50, 57-82, and 89-93.

Another aspect relates to a method of preparing a stable colloidal dispersion as defined herein.

Thus, provided herein is a process for preparing a colloidal dispersion, by admixing a silica sol and one or more solutions of one or more metal salts, so as to obtain a colloidal dispersion of silica particles carrying metal ions at the surface of said silica particles, wherein in each of said metal salts the metal is selected from metals having 21-31, 39-46, 48-50, 57-82, and 89-93.

Another aspect relates to formulations of certain metals, e.g. transition metals or lanthanide metals, in particular such metals forming multivalent ions, e.g. divalent or trivalent ions, which formulations are colloidal in nature, i.e. they consist of or comprise nano-sized particles, yet display a virtually perfect dispersion of the metal species.

In one embodiment, multivalent metal ions, e.g. transitions metal ions or lanthanide ions, are adsorbed on the surface of silca nanoparticles in a colloidal dispersion.

In one embodiment, more than one type of multivalent metal ions are adsorbed on the surface of particles of colloidal silica.

Yet another embodiment is a mixture of colloidal dispersions of silica particles (also referred to herein as "silica sols") where the multivalent metal ions adsorbed on each component sol are different, e.g. a mixture of one silica sol having one type of metal ions adsorbed at the surface of the silica particles, and another silica sol having another type of metal ions adsorbed at the surface of the silica particles.

In yet another embodiment there is provided a mixture of silica sols of different particle sizes obtained by blending silica sols of different particle sizes with the same or different multivalent metal ions adsorbed on the surface of the particles.

It should be realized that other embodiments are also contemplated, e.g. a mixture of silica sols, of which one sol contains particles of one size, having one type of multivalent metal ion adsorbed at the surface, and another sol contains silica particles of another size, and having another multivalent metal ion adsorbed at the particle surface, and/or another sol contains particles of another or the same size, and having more than one type of multivalent metal ions adsorbed at the particle surface.

Yet another embodiment is a mixture of silica sols wherein one component sol contains one or more multivalent metal ions adsorbed at the particle surface, and the other component sol contains a monovalent metal ion adsorbed at the particle surface, e.g. a monovalent transition metal, such as silver ion ($Ag^+$). Yet another embodiment is a mixture of silica sols of different particle sizes obtained by blending silica sols of different particles with the same or different multivalent metal ions, and optionally also monovalent metal ions, adsorbed at the surface of the particles.

In some embodiments, a stable colloidal dispersion is provided containing silica nanoparticles having at least one multivalent metal ion adsorbed at the surface and optionally also having a monovalent metal ion adsorbed at the surface.

Very advantageously, colloids with high concentrations of multivalent metals, e.g. multivalent transition metals or lanthanides, can be achieved according to the present invention.

A further aspect of the invention is that particle size and particle size distribution can be tailor made to meet narrow specifications. Another aspect of the present invention is that the relatively high concentrations of e.g. multivalent transition metals or lanthanides that can be obtained according to the present invention facilitate formulations of many products, for instance paints and sealants, containing materials of the present invention.

Another advantageous aspect is that the process for making materials of the present invention is simple, robust and cost effective.

The present inventor surprisingly found that in the colloidal dispersion of the present invention, metal cations such as those of cobalt, iron or gadolinium, can exist in relatively high concentrations, for instance 1000 to 2000 ppm, even at very high pH of e.g. 9, or higher, without the formation of any precipitation.

The same observation was made when adding other anions that normally will cause precipitation of the metal cation. For example, if a solution of sodium carbonate is added to a solution of cupric sulfate a precipitate of cupric carbonate will form instantly. If, on the other hand, a solution of sodium carbonate under similar conditions is added to a material of the present invention no precipitation will form.

DETAILED DESCRIPTION OF THE INVENTION

The Silica Sol

The particles of the silica sols used to prepare the materials of the present invention carry an anionic charge and the sols are anionic sols.

A convenient source of the silica particles of the present invention are commercial silica sols. Such sols are aqueous dispersions of silica particles and the particles are uniform spheres of silica, which have no internal surface area or detectable crystallinity. They are usually dispersed in an alkaline medium, which reacts with the silica surface to produce a negative charge. Because of the negative charge, the particles repel one another resulting in a stable product.

In some commercial products, the particle surface is modified with aluminosilicate ions so as to provide the surface with a fixed, pH-independent negative charge that will make the products more stable towards gelling than the sols from which they were prepared. Trivalent aluminium atoms have been substituted for part of the tetravalent silicon atoms in the surface of the particles, creating a fixed negative charge which is independent of pH. The surface coverage of Al is much less than that corresponding to a Langmuir monolayer.

The solids content depends on the particle size and varies from less than 10% by weight silica for the smallest particles, 3 nm, to about 50% by weight silica for larger particles, >20 nm. The surface of the particles in aqueous silica sols is covered with surface hydroxyl groups, silanol groups. The particle size of the silica sols used according to the present invention is typically in the range of 3-100, preferably 4-50 nm, more preferably 5-25 nm, even more preferably 5-15 nm, e.g. 5-12 nm, or 5-10 nm. The silica sols preferably have a specific surface area (e.g. by SEARS's titration or BET) of typically 20-1000 $m^2/g$, preferably 30-800 $m^2/g$, more preferably 100-600 $m^2/g$, even more preferably 200-600 $m^2/g$, and most preferably 200-550 $m^2/g$.

Stabilization of commercial silica sols is generally accomplished by adjusting the pH of the sol to between 8.0 and 10.0, normally by addition of alkali, usually a solution of sodium hydroxide. The sols also contain small amounts of other electrolytes such as sodium chloride and sodium sulfate.

The stability of highly concentrated silica sols is very sensitive to the presence of electrolytes. The electrolyte concentration can be reduced to a minimum by using ion exchange resins. The composite sols of the present invention may be prepared by use of commercial silica sols, or commercial silica sols modified, for instance by treating the sols with sodium aluminate solution so as to create aluminosilicate sites on the particle surface in order to obtain a silica sol that is stable in the pH range of 3-12, more particularly 4-11, by methods well known to the person of ordinary skill.

Thus, in some embodiments, at least some of the silica particles of the composite sol of the invention have aluminosilicate sites at the particle surface.

A convenient way to introduce aluminosilicate sites on the surface of colloidal silica is to use weak acid cation resin to remove sodium ions from the silica sol—sodium aluminate system and thus bring about reaction of the aluminate ions with the silica surface. In this system, pH will usually not fall below pH 5 even if an excess of weak acid cation exchange resin is used.

A calculated amount of sodium aluminate solution to give the desired number of aluminosilicate sites per $nm^2$ particle surface is simply added to the slurry of colloidal silica and resin.

The creation of aluminosilicate sites on the surface of silica is well described in the literature, (e.g. in Iler, The Chemistry of Silica, 1979, pp. 407-409). Such descriptions also indicate that it is difficult to introduce much more than about 2 aluminosilicate sites per $nm^2$ silica surface, for example.

When using aluminized silica particles in the composite sols of the invention, the concentration of aluminosilicate sites on the surface of the silica particles falls in the range from about 0.2 site per $nm^2$ to about 2.0 sites per $nm^2$, e.g. 0.30-1.50, or 0.3-1.25, or 0.4-1.0 site per $nm^2$, e.g. 0.4-0.8 site per $nm^2$.

Stability

The term stable used in the present invention means that the product should be stable toward gelling, implying that the relative viscosity should not increase more than 100% (e.g. from 5 to 10 mPas) under a period of about two months. The term also means stability toward precipitation; i.e. there is no substantial precipitation of solid content, characterised by that no more than 20% of the solid material has precipitated and settled as a sludge at the bottom, if stored under normal (e.g. ambient or optionally protected from light) conditions, for a period of two months.

The Metal Ion

The metal used according to the present invention essentially is a metal capable of forming multivalent cations, although also monovalent metal cations are contemplated as useful according to the invention. In some embodiments, the metal is one which may exist in more than one oxidation state, e.g. Cu or Fe. In some embodiments, the metal is one capable of forming multivalent metal ions only, e.g. divalent or trivalent metal ions only. In some embodiments, the metal is one capable of forming divalent metal ions only. In some embodiments, the metal is one capable of forming trivalent metal ions only.

Generally, with reference to the Periodic table of elements, the metal used according to the present invention is found in any one of the periods 4, 5 and 6 and groups IIIB, IVB, VB, VIB, VIIB, VIIIB, IB, IIB or IIIA (i.e. atomic numbers 21-31, 39-49 and 57-81); or in any of the periods 5 and 6 and group IVA (i.e. atomic numbers 50 and 82), or in period 7 and group IIIB (i.e. atomic numbers 89-103).

The elements with atomic numbers 21-31 are (by atomic number—atomic symbol—atomic name): 21—Sc—Scandium; 22—Ti—Titanium; 23—V—Vanadium; 24—Cr—Chromium; 25—Mn—Manganese; 26—Fe—Iron; 27—Co—Cobalt; 28—Ni—Nickel; 29—Cu—Copper; 30—Zn—Zinc; and 31—Ga—Gallium.

The elements with atomic numbers 39-50 are (by atomic number—atomic symbol—atomic name): 39—Y—Yttrium; 40—Zr—Zirconium; 41—Nb—Niobium; 42—Mo—Molybdenum; 43—Tc—Technetium; 44—Ru—Ruthenium; 45—Rh—Rhodium; 46—Pd—Palladium; 47—Ag—Silver; 48—Cd—Cadmium; 49—In—Indium; and 50—Sn—Tin.

The elements with atomic numbers 57-82 are (by atomic number—atomic symbol—atomic name): 57—La—Lanthanum; 58—Ce—Cerium; 59—Pr—Praseodymium; 60—Nd—Neodymium; 61—Pm—Promethium; 62—Sm—Samarium; 63—Eu—Europium; 64—Gd—Gadolinium; 65—Tb—Terbium; 66—Dy—Dysprosium; 67—Ho—Holmium; 68—Er—Erbium; 69—Tm—Thulium; 70—Yb—Ytterbium; 71—Lu—Lutetium; 72—Hf—Hafnium; 73—Ta—Tantalum; 74—W—Tungsten; 75—Re—Rhenium; 76—Os—Osmium; 77—Ir—Iridium; 78—Pt—Platinum; 79—Au—Gold; 80—Hg—Mercury; 81—Ti—Thallium; and 82—Pb—Lead.

The elements with atomic numbers 89-103 are (by atomic number—atomic symbol—atomic name): 89—Ac—Actinium; 90—Th—Thorium; 91—Pa—Protactinium; 92—U—Uranium; 93—Np—Neptunium; 94—Pu—Plutonium; 95—Am—Americium; 96—Cm—Curium; 97—Bk—Berkelium; 98—Cf—Californium; 99—Es—Einsteinium; 100—Fm—Fermium; 101—Md—Mendelevium; 102—No—Nobelium; and 103—Lr—Lawrencium.

In some embodiments, the metal used according to the present invention is found in any one of the periods 4, 5 and 6 and groups IIIB, IVB, VB, VIB, VIIB, VIIIB, IB, IIB or IIIA (i.e. atomic numbers 21-31, 39-49 and 57-81); or in any of the periods 5 and 6 and group IVA (i.e. atomic numbers 50 and 82).

In some embodiments, the metal used according to the present invention is found in any one of the periods 4, 5 and 6 and groups IIIB, IVB, VB, VIB, VIIB, VIIIB, IB, IIB, or IIIA (i.e. atomic numbers 21-31, 39-49 and 57-81).

In some embodiments, the metal used according to the present invention is found in any one of the periods 4 and 5 and groups IIIB, IVB, VB, VIB, VIIB, VIIIB, IB, IIB or IIIA (i.e. atomic numbers 21-31 and 39-49, or in period 5 and group IVA (i.e. atomic number 50).

In some embodiments, the metal used according to the present invention is found in any one of the periods 5 and 6 and groups IIIB, IVB, VB, VIB, VIIB, VIIIB, IB, IIB, IIIA or IVA (i.e. atomic numbers 39-50 and 57-80). In some of these embodiments, the metal used according to the invention is one that has an atomic number of from 39 to 48 or from 57 to 80.

In some embodiments, the metal used according to the present invention is selected from period 4 and groups IIIB, IVB, VB, VIB, VIIB, VIIIB, IB, IIB or IIIA (i.e. atomic numbers 21-31).

In some embodiments, the metal used according to the present invention is selected from period 5 and groups IIIB, IVB, VB, VIB, VIIB, VIIIB, IB, IIB, IIIA or IVA (i.e. atomic numbers 39-50).

In some embodiments, the metal used according to the present invention is selected from period 6 and groups IIIB, IVB, VB, VIB, VIIB, VIIIB, IB, IIB, IIIA or IVA (i.e. atomic numbers 57-82).

When the metal used according to the present invention is one found in period 4, said metal is selected from Sc, Ti, V, Cr, Mn, Fe, Co, Ni, Cu, Zn and Ga. In some embodiments, a metal selected from period 4 more particularly is selected from Ti, V, Cr, Mn, Fe, Co, Ni, Cu, and Zn; more particularly from Cr, Mn, Fe, Co, Ni, Cu, and Zn. In some embodiments, a metal selected from period 4 more particularly is selected from Cr, Fe, Co, Cu, and Zn. In some embodiments, a metal selected from period 4 more particularly is selected from Fe, Co, Cu, and Zn. In some embodiments, a metal selected from period 4 more particularly is selected from Fe, Co, and Cu. In some embodiments, a metal selected from period 4 more particularly is selected from Co, Cu and Zn. In some embodiments, a metal selected from period 4 more particularly is selected from Cu and Zn. In some embodiments, a metal selected from period 4 more particularly is Cu. In some embodiments, a metal selected from period 4 more particularly is Zn. In some embodiments, a metal selected from period 4 more particularly is Fe.

When the metal used according to the present invention is one of period 5, said metal is selected from Y, Zr, Nb, Mo, Tc, Ru, Rh, Pd, Ag, Cd, In and Sn. In some embodiments, a metal selected from period 5 more particularly is selected from Zr, Nb, Mo, Tc, Ru, Rh, Pd, Ag, Cd, In and Sn. In some embodiments, a metal selected from period 5 more particularly is selected from Ru, Rh, Pd, Ag, Cd, In and Sn; or from Ru, Rh, Pd, Ag, and Sn. In some embodiments, a metal selected from period 5 more particularly is Sn. In some embodiments, a metal selected from period 5 is not Ag, or is Ag only when at least one further metal ion according to the invention is present in the composite sol, e.g. at least one multivalent metal ion.

When the metal used according to the present invention is one of period 6, said metal is selected from the lanthanide series (metals of atomic number 57-71) as well as from metals of atomic number 72-82. In some embodiments, a metal from period 6, more particularly is a metal from the lanthanides series. In some embodiments, when the metal is selected from the lanthanide series, it more particularly is Gd.

In some embodiments, a metal selected from period 6 is one of atomic number 72-82. In some embodiments, when the metal is one of atomic number 72-82, it more particularly is one of atomic number 72-80, e.g. or one of atomic number 72-79. In some embodiments, when the meal is of atomic number 72-82, it more particularly is Pb.

In some embodiments, when the metal used according to the present invention is present as a monovalent metal cation, e.g. Ag*, the colloidal dispersion or the mixture of colloidal dispersions of the invention also includes at least one other cation of a metal selected from the above indicate period 4, 5 and 6 elements, which cation is present as a multivalent cation, e.g. a divalent or trivalent cation.

In some embodiments, the metal used according to the present invention is selected from periods 4, 5 and 6 and groups VIB, VIIB, VIIIB, IB, IIB, and IIIA and from periods 5 and 6 and group IVA.

In some embodiments, the metal used according to the present invention is selected from periods 4, 5 and 6 and groups VIB, VIIB, VIIIB, IB, IIB, and IIIA.

In some embodiments, the metal used according to the present invention is selected from periods 4, 5 and 6 and groups VIB, VIIB, VIIIB, IB, and IIB.

In some embodiments, the metal used according to the present invention is selected from periods 4, 5 and 6 and group VIB, e.g. from periods 4 and 5 and group VIB.

In some embodiments, the metal used according to the present invention is selected from periods 4, 5 and 6 and group VIIB, e.g. from periods 4 and 5 and group VIIB.

In some embodiments, the metal used according to the present invention is selected from periods 4, 5 and 6 and group VIIIB, e.g. from periods 4 and 5 and group VIIIB.

In some embodiments, the metal used according to the present invention is selected from periods 4, 5 and 6 and group IB. In some embodiments, when the metal is selected from group IB, it is not Ag, or is Ag only in the presence of a further metal as defined herein.

In some embodiments, the metal used according to the present invention is selected from periods 4, 5 and 6 and group IIB.

In some embodiments, the metal used according to the present invention is selected from periods 5 and 6 and group IVA.

In some embodiments, the metal used according to the present invention is selected from Cr, Mn, Fe, Co, Cu, Zn, Sn, Gd and Pb.

A multivalent cation according to the present invention is one having a charge z which is higher than 1. Examples of multivalent cations according to the present invention are $Cr^{3+}$, $Fe^{2+}$, $Fe^{3+}$, $Mn^{2+}$, $Co^{2+}$, $Cu^{2+}$, $Zn^{2+}$, $Sn^{2+}$, $Pb^{2+}$, and $Gd^{3+}$.

Finally, in some embodiments, the metal used according to the present invention is selected from period 7 and group IIIB, i.e. it belongs to the actinide series (atomic number 89-103, e.g. Ac, Th, Pa and U).

For the purpose of the present invention, any reference to a metal (cation), multivalent (e.g. divalent or trivalent) metal (cation), or transition metal (cation) shall be understood as included in scope of the invention, unless otherwise specified or apparent from the context.

In some embodiments, the metal used herein is a transition metal. In some embodiment, the metal used herein is a transition metal capable of forming divalent or trivalent cations. In some embodiments, the metal used herein is a lanthanide metal. In some embodiments, the metal used herein is a lanthanide metal capable of forming divalent or trivalent cations.

Procedures

Nano-composite materials according to the present invention are prepared by contacting a non-metallic carrier material in the form of e.g. colloidal silica with a solution comprising metals ions as specified herein. The reactants and products used in the various preparations and methods fall in the domain of colloids and colloid chemistry and due care has to be taken concerning concentration of reactants and products, maintaining a high electrical charge on colloidal particles, using water of good quality, preferably deionised water, observing proper rate of addition and order of addition of the components, working in conservative but realistic temperature ranges and providing sufficient agitation and stirring so as to maintain stability towards gelling or aggregation of reactants and products. Selecting and optimizing conditions of the beforementioned type are considered to be within the capacity of the person of ordinary skill in the art, in light of the present description and the embodying examples.

The colloidal silica sol used to prepare the composite sol of the invention of the present invention generally has a concentration of from 0.1% by weight of $SiO_2$ or less to undiluted sols that could contain 50% by weight of $SiO_2$ or more.

Most soluble salts of the metals mentioned as useful herein above, can be used to prepare the materials of the present invention.

So as to achieve strong adsorption (attachment) of metal ions on the surface of nano-sized carrier particles the electrical charge of the latter should be high but of opposite sign to that of the metal ions.

The charge on the particles of colloidal silica or on particles of silica in an aqueous environment increases exponentially with pH and is almost 0.5 units of negative charge per $nm^2$ particle surface at a pH of about 10 and at very low, $10^{-4}$ normal, electrolyte concentrations. Colloidal silica has a local stability maximum at the point of zero charge, which occurs at about pH 2.0. The stability of a silica sol first decreases with pH and reaches a minimum around pH 6, after which the sol enters a region of high stability between pH 8 and pH 11.

The stability towards gelling and flocculation, of solutions of in particular transition metals in water is quite sensitive to pH. If pH is raised a few units above the natural pH of the solution gelling and/or flocculation will occur. In experiments performed by the inventor, most solutions of transition metals required the addition of only a few, say 3-5, drops of 1 M NaOH before flocs could be seen in the solutions (the sample size was typically 50 g and a drop from a plastic pipette typically weighed 0.025 g). The exact value of pH at which formation of flocs becomes visible to the naked eye depends on the type and concentration of metal in the solution.

Although silica sols are stable over a wide pH range it is preferable to prepare the formulations of the invention in the pH region of 8-12, more particularly 9-11, where silica sols are most stable.

The concentration of the metal solutions used according to the present inventions is preferably in the range of from about 0.1 mM ($10^{-4}$ mol/L) to about 200 mM, e.g. from about 0.2 mM to about 100 mM, e.g. from about 0.5 mM to about 50 mM, or from about 1 mM to about 20 mM, or from about 2 mM to about 10 mM, although both higher and lower concentrations are contemplated as possible. The concentration of the metal in the composite sol will be somewhat lower due to the diluting effect of mixing the metal solution with the silica sol. Thus, composite sols may be prepared according to the invention that contain from about 0.01 mM metal cation or less, to about 100 mM metal cation or more, e.g. about 0.05 mM to about 50 mM, or about 0.1 mM to about 40 mM, or about 0.5 mM to about 30 mM, or about 1 mM to about 10 mM cation of metal(s) of the invention.

The charge of metal ions in solution, usually aqueous solutions, is normally positive. This is the case for transition metal ions and other metal ions of this invention, which usually, but not always, form divalent (i.e. having a net charge of +2) or trivalent (i.e. having a net charge of +3) cations in aqueous solutions.

In some embodiments, the silica sols contain aluminosilicate-modified silica particles. Adsorption of metal cations on aluminosilicate-modified silica sols can be carried out over a wide pH range, e.g. from about pH of about 3 to a pH of about 12, e.g. from a pH of about 4 to a pH of about 11.5, or a pH of about 5 to a pH of about 11, e.g. a pH of about 6 to a pH of about 10.5. However, it is preferable to carry out the adsorption in the pH range where silica sols are most stable, that is the alkaline range, for instance in the pH range from about 8 to about 11, e.g. about 8 to 10.5.

The pH can be controlled at different steps of the process for making the composite sols of the invention. In most of the examples as described herein below, the silica sol was added to the transition metal salt solution and the pH was then adjusted to between 10 and 11 by adding 1 M NaOH-solution to the metal containing silica sol. Alternatively, alkali can be added to the silica sol before said sol is added to the metal salt solution or before the metal salt solution is added to said sol.

The rate at which metal salt solution can be admixed with the silica sol without destabilizing the sol depends on the conditions being used in the preparation. The rate of addition can be fast as long as the increments of added salt are rapidly dispersed throughout the sol, or vice verse. However, the robustness of the colloidal systems according to the present invention is quite surprising. In many of the small scale preparations it is actually possible to inject silica sol into a magnetically stirred transition metal salt solution in very short times, for instance less than 10 to 15 seconds, without destabilizing the sol. However, in most of the small scale laboratory preparations, for instance preparations of sols containing about 1000 ppm of metal, longer addition times, typically 2 to 3 minutes were used so as to be on the safe side in terms of having good stability towards gelling or aggregation. Similar time scales will apply to larger scale preparations provided that sufficient agitation or stirring is used.

In the present specification, any ppm value is calculated based on a weight basis. Thus, e.g. in a solution of metal ion containing n ppm metal, there is n mg metal present per kg of solution. Likewise, in a silica sol containing n ppm metal, there is n mg metal present per kg of the metal-containing silica sol.

A sol of a given concentration of the selected (e.g. transition) metal can be prepared in different ways. In one method, a certain amount of the metal solution is added to a silica sol with specified values of particle size and concentration of silica. In another method, the same amount of the metal solution is added to a sol of the same particle size but higher, for instance four times higher, concentration of silica. The overall concentration of the selected metal is the same in the two sols but the concentration of metal on the particle surface of the former sol is higher—four times higher—than that of the latter sol. Thus, a material of the present invention with a given, overall concentration of metal and a given particle size can be obtained by combining high concentration of particles, that is high concentration of silica, with low concentration of metal on the particle surfaces or by combining high surface concentration of metal with low silica concentration.

The concentration of $SiO_2$ of the composite sol of the present invention generally ranges from about 0.001% by weight, e.g. about 0.005% by weight, or about 0.01% by weight, or about 0.05% by weight, or about 0.1% by weight, or about 0.5% by weight, or about 1% by weight, or about 2% by weight, to about 25% by weight, or about 20% by weight, or about 15% by weight, or about 10% by weight of $SiO_2$, or about 8% by weight, or about 5% by weight, the remaining part (adding up to 100%) normally comprising the selected metal ion(s) and water. For example, in some embodiments, the concentration of $SiO_2$ of the composite sol of the present invention ranges from about 0.005% by weight to about 15% by weight, e.g. from about 0.1% by weight to about 10% by weight, or from about 0.5% by weight to about 5% by weight.

Metal Population on Particle Surface

Knowing the concentration of metal in the sol, the atomic weight of the metal in question, the specific surface area of the silica particles and concentration of silica in weight percent, the surface concentration, $C_s$, of metal atoms (ions) per $nm^2$ of $SiO_2$ particle surface, can be calculated according to equation (1):

$$C_s = 60 M_1/(M_{met} A K) = (60/AK)(M_1/M_{met}) \quad (1)$$

wherein $M_1$ is the concentration of metal in the sol, in ppm, $M_{met}$ is the atomic weight of the metal, in g, A is the specific surface area of the sol particles, in $m^2/g$, and K is the concentration of silica in weight percent The concentration of metal ions on the surface of the ultimate particles making up the materials of this invention falls in the range from about 0.0005, or from about 0.004, or from about 0.005, or from about 0.006, or from about 0.008, or from about 0.01, or from about 0.02, or from about 0.03, or from about 0.04, or from about 0.05, or from about 0.08, or from about 0.1 metal ion per $nm^2$ to about 5, or to about 4, or to about 3, or to about 2 metal ions per $nm^2$, e.g. to about 1 metal ion per $nm^2$. In some embodiments, the concentration of metal ions on the particle surface of the colloidal silica sol of the invention ranges from about 0.01 metal ion per $nm^2$ to about 2 metal ions per $nm^2$, e.g. about 0.01 to about 1 metal ion per $nm^2$, or about 0.05 to about 1 metal ion per $nm^2$, more preferably about 0.1 to about 0.8 metal ion per $nm^2$.

In the case of silica particles having aluminosilicate sites at the surface, it is considered that typically one metal ion adsorbs on one Al—Si-site, but not all Al—Si sites may have adsorbed transition metal species adsorbed on them. The ratio by number between metal ions and Al—Si sites may vary within the range of from 0.01 to about 1.0, but is preferably between 0.05 and 0.8, e.g. between 0.1 and 0.6.

By "adsorption" according to the present invention is meant that the metal ion attaches to the surface, whether by electrostatic or ionic bonding or any other type of bonding, e.g. partly covalent bonding. The adsorption of metal ions on the surface of the silica particles may be monitored by measuring the Zeta potential of the colloidal sol.

The load of metal ions vs. silica particles may be expressed as number of metal cations per unit of surface area of the silica particles. This is the "specific metal load" or surface concentration of the metal cation $c_s$.

The load of metal ion vs. silica particles in the composite sol may also be expressed as the number of metal ions $n_m$ for each silica particle. However, for very low metal loads, it may be more meaningful to express the relationship between the number of metal ions and number of particles in the silica sol as the inverse of the number of metal ions for each silica particle, i.e. $n_m^{-1}$.

The relationship between $n_m^{-1}$ and $c_s$ is given by the equation (2):

$$n_m^{-1} = \frac{1}{n_m} * \frac{A_p}{A_p} = \frac{1}{c_s * A_p} \quad (2)$$

wherein $n_m$ is the number of metal ions per silica particle in the composite sol, Ap is the surface area of one silica particle in the composite sol, and $c_s$ is the surface concentration of metal ions at the surface of the silica particle.

Equation (2) shows that $n_m^{-1}$ is inversely proportional to the surface area $A_p$ of the particle and the surface concentration $c_s$ of metal ions at the surface of the silica particles.

For $c_s = 0.0005$ ions/$nm^2$, Table 2 illustrates how $n_m^{-1}$, viz. the number of silica particles per ion, varies as a function of the silica particle diameter.

TABLE 2

Number of silica particles per metal ion as a function of particle diameter in a composite sol, $c_s = 0.0005$ ions/nm$^2$

| Particle diameter (nm) | number of particles per ion |
|---|---|
| 5 | 25 |
| 7 | 13 |
| 12 | 4.4 |
| 22 | 1.3 |

As may be seen from Table 2, at $c_s=0.0005$ ions/nm$^2$ and a particle diameter of 5 nm, 4 out of 100 silica particles in the composite sol of the invention carry a metal cation, viz. there are 25 particles present for each metal ion in the composite sol.

In other words, the number ratio between metal ions and silica particles in the composite sol of the present invention may vary from high values, where more than one metal ion is present for each silica nanoparticle, e.g. more than 10 metal ions are present for each silica nanoparticle, to low values, where more than one silica nanoparticle is present for each metal ion, e.g. more than 10 silica nanoparticles are present for each metal ion.

Uses of the Composite Sols

The present invention successfully combines advantageous features of various useful metals, on the one hand, and nanomaterials, on the other hand. Indeed, the metals included in the formulations of the invention are well known for their biocidal, catalytic and/or magnetic properties. Nanotechnology has the potential to address a number of today's biggest scientific challenges, ranging from the need for more efficient alternative energy technologies, faster and flexible electronics, to improved disease diagnosis and treatment. The formulations of the present invention, being or comprising nanomaterials, very advantageously combines useful properties of metals as used herein with the properties of nanomaterials, thereby allowing for an important potential contribution to the development of new and improved drugs, catalysts and catalytic materials, electronic materials, and crop protection products.

The invention will be better understood but not limited by reference to the following Comparative Examples and illustrative Examples.

In the Comparative Examples and Examples, stock solutions containing 9000 ppm of salts of some representative metals according to the invention were used, as shown in Table 3.

TABLE 3

Stock solutions containing 9000 ppm of metal

| Metal | Salt | Molar weight (g) | pH | Appearance/comments |
|---|---|---|---|---|
| Copper | $CuCl_2 \cdot 2H_2O$ | 170.48 | 4.1 | Clear, blue |
| Chrome | $CrCl_3 \cdot 6H_2O$ | 266.45 | 2.6 | Clear, dark blue |
| Iron | $FeCl_3 \cdot 6H_2O$ | 270.30 | 1.6 | Clear, orange |
| Cobolt | $CoCl_2 \cdot 6H_2O$ | 237.93 | 5.8 | Clear. light red |
| Lead | $Pb(C_2H_3O_2)3 \cdot H_2O$ | 379.33 | 6.0 | Some sediment. Clear supernatant |

TABLE 3-continued

Stock solutions containing 9000 ppm of metal

| Metal | Salt | Molar weight (g) | pH | Appearance/comments |
|---|---|---|---|---|
| Tin | $SnCl_2 \cdot 2H_2O$ | 225.65 | 1.5 | Some sediment. Clear yellow supernatant |
| Zinc | $C_4H_6O_4Zn \cdot 2H_2O$ | 219.51 | 5.8 | Some sediment. Clear supernatant |
| Gadolinium | $Gd(NO_3)_3 \cdot 6H_2O$ | 460.36 | 3.5 | Clear |
| Manganese | $C_4H_6MnO_4 \cdot 4H_2O$ | 245.09 | 6.9 | Clear |

Comparative Examples

Samples of the stock solutions of Table 3 were diluted with deionized water to 90, 270, 450, 1000, 2000, 3000 and 4000 ppm (by weight) of metal. The obtained diluted solutions were further diluted by admixing 2 volumes of solution with 5 volumes of deionized water to provide samples solutions of 26, 77, 129, and 286 ppm metal, respectively (cf. Table 4a-h), or were used directly without further dilution (cf. Tables 5a-g).

In the experiments summarized in Table 4a-h, a "critical flocculation pH" was estimated by adding one drop of 1 M NaOH at a time by a plastic pipette to 20 g of metal solutions of different concentrations in the range from about 20 ppm to about 600 ppm and noting the pH at which the first indication of flocculation could be seen.

TABLE 4a

Critical pH of $CuCl_2$ solutions of different concentrations

| Ex. | Conc. ppm | Initial pH | # drops of 1M NaOH at first floc | pH at first floc | Appearance/comments |
|---|---|---|---|---|---|
| 1 | 26 | 5.0 | 6 | 11.0 | Floc after 15 minutes |
| 2 | 77 | 5.6 | 6 | 8.8 | Floc |
| 3 | 129 | 5.9 | 5 | 7.0 | Hazy. Floc after 2 hours |
| 4 | 286 | 6.0 | 5 | 5.6 | Hazy. Floc after 2 hours |

TABLE 4b

Critical pH of $FeCl_3$ solutions of different concentrations

| Ex. | Conc. ppm | Initial pH | # drops of 1M NaOH at first floc | pH at first floc | Appearance/comments |
|---|---|---|---|---|---|
| 1 | 26 | 3.7 | 14 | 11.9 | Faint yellow. Floc after 4 days |
| 2 | 77 | 3.4 | 13 | 11.6 | Faint yellow. Floc after 4 days |
| 3 | 129 | 3.2 | 11 | 5.9 | Yellow-orange. Cloudy. Floc after 4 days |
| 4 | 286 | 2.8 | 19 | 5.8 | Yellow-orange. Cloudy. Floc after 4 days |

TABLE 4c

Critical pH of $CrCl_3$ solutions of different concentrations

| Ex. | Conc. ppm | Initial pH | # drops of 1M NaOH at first floc | pH at first floc | Appearance/ comments |
|---|---|---|---|---|---|
| 1 | 26 | 5.7 | 7 | 11.5 | Clear. Some floc after 11 days |
| 2 | 77 | 4.5 | 6 | 7.8 | Hazy. Floc after 11 days |
| 3 | 129 | 4.0 | 10 | 7.1 | Hazy. Floc after 11 days |
| 4 | 286 | 3.6 | 19 | 5.6 | Hazy. Floc |

TABLE 4d

Critical pH of $CoCl_2$ solutions of different concentrations

| Ex. | Conc. ppm | Initial pH | # drops of 1M NaOH at first floc | pH at first floc | Appearance/ comments |
|---|---|---|---|---|---|
| 1 | 26 | 7.7 | 7 | 10.9 | Floc |
| 2 | 77 | 7.6 | 3 | 8.5 | Floc |
| 3 | 129 | 7.6 | 4 | 8.1 | Floc |
| 4 | 286 | 7.6 | 2 | 7.5 | Floc |

TABLE 4e

Critical pH of $GdNO_3$ solutions of different concentrations

| Ex. | Conc. ppm | Initial pH | # drops of 1M NaOH at first floc | pH at first floc | Appearance/ comments |
|---|---|---|---|---|---|
| 1 | 26 | 7.3 | 4 | 10.9 | Clear. Some floc after 7 days |
| 2 | 77 | 7.0 | 3 | 8.8 | Floc |
| 3 | 129 | 6.8 | 4 | 7.9 | Floc |
| 4 | 286 | 7.0 | 9 | 7.2 | Floc |

TABLE 4f

Critical pH of $MnC_4H_6O_4$ solutions of different concentrations

| Ex. | Conc. ppm | Initial pH | # drops of 1M NaOH at first floc | pH at first floc | Appearance/ comments |
|---|---|---|---|---|---|
| 1 | 26 | 6.8 | 2 | 7.2 | Floc |
| 2 | 77 | 7.5 | 2 | 7.7 | Floc |
| 3 | 129 | 7.7 | 2 | 7.8 | Floc |
| 4 | 286 | 8.0 | 2 | 7.9 | Floc |

TABLE 4g

Critical pH of $ZnC_4H_6O_4$ solutions of different concentrations

| Ex. | Conc. ppm | Initial pH | # drops of 1M NaOH at first floc | pH at first floc | Appearance/ comments |
|---|---|---|---|---|---|
| 1 | 26 | 7.0 | 9 | 11.2 | Floc |
| 2 | 77 | 7.2 | 6 | 8.1 | Floc |
| 3 | 129 | 7.1 | 6 | 8.8 | Floc |
| 4 | 286 | 7.0 | 4 | 6.9 | Floc |

TABLE 4h

Critical pH of $PbC_4H_6O_4$ solutions of different concentrations

| Ex. | Conc. ppm | Initial pH | # drops of 1M NaOH at first floc | pH at first floc | Appearance/ comments |
|---|---|---|---|---|---|
| 1 | 26 | 7.2 | 4 | 10.5 | Floc |
| 2 | 77 | 7.3 | 4 | 10.5 | Floc |
| 3 | 129 | 7.0 | 2 | 9.3 | Floc |
| 4 | 286 | 7.0 | 4 | 10.5 | Floc |

Table 4a to 4h illustrates that the aqueous solubility of many metal hydroxides, e.g. of transition metals, is very low (cf. also Table 1), and that the critical pH in most cases rapidly decreases as the concentration of metal ion is increased.

Tables 5a to 5g further illustrate that at a high pH (e.g. a pH within the region of maximum stability of silica sols) aqueous solutions of transition metals will floc even at quite low metal concentrations.

TABLE 5a

Effect of pH on the stability of aqueous solutions of transition metals: $CuCl_2$ solutions with different concentrations of $Cu^{2+}$

| Ex. | Conc. ppm | pH before adjustment | # drops of 1M NaOH | pH after adjustment | Appearance/ comments |
|---|---|---|---|---|---|
| 1 | 90 | 5.7 | 5 | 11.1 | Floc |
| 2 | 270 | 5.8 | 11 | 11.0 | Floc |
| 3 | 450 | 5.7 | 17 | 10.9 | Floc |
| 4 | 1000 | 5.5 | 24 | 10.8 | Floc |
| 5 | 2000 | 4.8 | 35 | 10.5 | Floc |

TABLE 5b

Effect of pH on the stability of aqueous solutions of transition metals: $FeCl_3$ solutions with different concentrations of $Fe^{3+}$

| Ex. | Conc. ppm | pH before adjustment | # drops of 1M NaOH | pH after adjustment | Appearance/ comments |
|---|---|---|---|---|---|
| 1 | 90 | 2.6 | 8 | 10.5 | Floc |
| 2 | 270 | 2.4 | 11 | 11.0 | Floc |
| 3 | 450 | 2.6 | 10 | 10.7 | Floc |

TABLE 5b-continued

Effect of pH on the stability of aqueous solutions of transition metals: FeCl$_3$ solutions with different concentrations of Fe$^{3+}$

| Ex. | Conc. ppm | pH before adjustment | # drops of 1M NaOH | pH after adjustment | Appearance/ comments |
|---|---|---|---|---|---|
| 4 | 1000 | 2.3 | 33 | 10.6 | Floc |
| 5 | 2000 | 2.7 | 35 | 10.5 | Floc |

TABLE 5c

Effect of pH on the stability of aqueous solutions of transition metals: CrCl$_3$ solutions with different concentrations of Cr$^{3+}$

| Ex. | Conc. ppm | pH before adjustment | # drops of 1M NaOH | pH after adjustment | Appearance/ comments |
|---|---|---|---|---|---|
| 1 | 90 | 4.3 | 10 | 11.2 | Floc |
| 2 | 270 | 4.2 | 11 | 11.5 | Floc |
| 3 | 450 | 4.1 | 16 | 11.0 | Floc |
| 4 | 1000 | 3.0 | 70 | 11.5 | Floc |
| 5 | 2000 | 3.2 | 66 | 10.5 | Floc |

TABLE 5d

Effect of pH on the stability of aqueous solutions of transition metals: CoCl3— solutions with different concentrations of Co$^{2+}$

| Ex. | Conc. ppm | pH before adjustment | # drops of 1M NaOH | pH after adjustment | Appearance/ comments |
|---|---|---|---|---|---|
| 1 | 90 | 6.5 | 5 | 11.0 | Floc |
| 2 | 270 | 8.3 | 10 | 11.0 | Floc |
| 3 | 450 | 8.4 | 17 | 10.7 | Floc |
| 4 | 1000 | 7.3 | 34 | 10.8 | Floc |
| 5 | 2000 | 7.7 | 40 | 10.7 | Floc |

TABLE 5e

Effect of pH on the stability of aqueous solutions of transition metals: GdNO$_3$ solutions with different concentrations of Gd$^{3+}$

| Ex. | Conc. ppm | pH before adjustment | # drops of 1M NaOH | pH after adjustment | Appearance/ comments |
|---|---|---|---|---|---|
| 1 | 90 | 6.2 | 5 | 11.5 | Floc |
| 2 | 270 | 6.7 | 5 | 11.0 | Floc |
| 3 | 450 | 6.9 | 6 | 10.9 | Floc |
| 4 | 1000 | 6.6 | 22 | 11,3 | Floc |
| 5 | 2000 | 6.9 | 25 | 11.5 | Floc |

TABLE 5f

Effect of pH on the stability of aqueous solutions of transition metals: ZnC$_4$H$_6$O$_4$ solutions with different concentrations of Zn$^{2+}$

| Ex. | Conc. ppm | pH before adjustment | # drops of 1M NaOH | pH after adjustment | Appearance/ comments |
|---|---|---|---|---|---|
| 1 | 90 | 8.0 | 5 | 11.1 | Floc |
| 2 | 270 | 7.2 | 11 | 11.0 | Floc |
| 3 | 450 | 6.8 | 17 | 10.9 | Floc |
| 4 | 1000 | 6.8 | 24 | 10.8 | Floc |
| 5 | 2000 | 6.9 | 35 | 10.5 | Floc |

TABLE 5g

Effect of pH on the stability of aqueous solutions of transition metals: PbC$_4$H$_6$O$_4$ solutions with different concentrations of Pb$^{2+}$

| Ex. | Conc. ppm | pH before adjustment | # drops of 1M NaOH | pH after adjustment | Appearance/ comments |
|---|---|---|---|---|---|
| 1 | 90 | 7.5 | 8 | 11.0 | Floc |
| 2 | 270 | 7.3 | 11 | 11.0 | Floc |
| 3 | 450 | 7.1 | 17 | 10.9 | Floc |
| 4 | 1000 | 6.7 | 23 | 10.8 | Floc |
| 5 | 2000 | 7.1 | 29 | 10.7 | Floc |

Examples

Examples of the invention were prepared using various metal solutions in admixture with different silica sols, of which some had aluminosilicate sites at the particle surface. The silica sols used were of the Bindzil® series, sold by Akzo Nobel AB. Characteristics of silica sols used in the examples are shown in Table 6.

TABLE 6

Characterization of Bindzil ® silica sols

| Bindzil ® | Specific surface area m$^2$/g | Part. size nm | Silica % | pH | Viscosity cp | Density | Na$_2$O % by weight | Al$_2$O$_3$ % by weight |
|---|---|---|---|---|---|---|---|---|
| 15/500 | 525 | 5 | 15 | 10.0 | 3 | 1.1 | 0.4 | — |
| 159/500 | 525 | 5 | 15 | 9.5 | 3.5 | 1.1 | 0.4 | 0.5 |
| 30/360 | 360 | 7 | 30 | 10.1 | 6 | 1.2 | 0.6 | — |
| 257/360 | 360 | 7 | 25 | 10.0 | 4 | 1.2 | 0.6 | 0.4 |
| 30/220 | 220 | 12 | 30 | 9.9 | 5 | 1.2 | 0.31 | — |
| 309/220 | 220 | 12 | 30 | 10.5 | <15 | 1.2 | 0.53 | 0.42 |
| 40/130 | 130 | 22 | 40 | 9.1 | 8 | 1.3 | 0.2 | — |

In the examples, 50 g of a silica sol containing 5% by weight of $SiO_2$ were added in a thin stream to 20 g of the dilute solution of metal salt under vigorous agitation. This is the preferred order of addition of the components of the compositions of the present invention but the components can also be added in the reverse order (i.e. a dilute solution of the metal salt is added to the silica sol). When this has been done, this is indicated by a star (*).

The composite sols were prepared by mixing 20 g of metal salt solutions containing 90, 270, 450, 1000, 2000, 3000, or 4000 ppm metal, prepared from the stock solutions of Table 3, with 50 g of silica sol diluted with deionized water to 5% by weight of $SiO_2$. The metal concentration of the composite sols thus was 2/7 of that of the original metal salt solutions, viz. 26, 77, 129, 286, 571, 857 and 1142 ppm metal, respectively, whereas the silica concentration was 5/7 of that of the original silica sol, viz. 3.6% by weight.

The below tables show results for mixtures of solutions of salts of $Cu^{2+}$, $Fe^{3+}$, $Cr^{3+}$, $Mn^{3+}$, $Ni^{2+}$, $Co^{2+}$, $Zn^{2+}$ and $Gd^{3+}$, $Pb^{2+}$ and $Sn^{2+}$ with different types of silica sol.

In column 4, the amounts of 1 M NaOH solution needed to raise the pH to between 10.0 and 11.0 are shown. In most cases alkali was added to the mixture of silica sol and metal solution, but in some cases it was added to the diluted silica sol before the sol was mixed with the salt solution or the metal salt solution was mixed with the sol.

TABLE 7a

Cu sol of Bindzil ® 159/500 with different concentrations of $Cu^{2+}$

| Ex. | Conc. ppm | pH before adjustment | # drops of 1M NaOH | pH after adjustment | Appearance/ comments | $C_s^{(1)}$ atoms/nm² |
|---|---|---|---|---|---|---|
| 1 | 26 | 10.1 | 5 | 10.5 | Clear/colorless | 0.013 |
| 2 | 77 | 9.7 | 8 | 10.5 | Clear/colorless | 0.039 |
| 3 | 129 | 9.2 | 10 | 10.5 | Clear/colorless | 0.069 |
| 4 | 286 | 6.8 | 18 | 10.5 | Clear/faint blue | 0.150 |
| 5 | 571 | 5.4 | 54 | 10.5 | Clear/blue | 0.300 |
| 6 | 1286 | 5.4 | 70 | 10.5 | First blue gel. Cleared to faintly hazy liquid in 3-5 days | 0.675 |
| 7* | 1286 | 5.6 | 72 | 10.5 | First blue gel. Cleared to faintly hazy liquid in 3-5 days | 0.675 |

(1)Calculated according to Equation 1, cf. below.

TABLE 7b

Cu sol of Bindzil ® 15/500 with different concentrations of $Cu^{2+}$

| Ex. | Conc. ppm | pH before adjustment | # drops of 1M NaOH | pH after adjustment | Appearance/ comments |
|---|---|---|---|---|---|
| 1 | 26 | 10.3 | 4 | 10.5 | Clear/colorless |
| 2 | 77 | 10.0 | 6 | 10.5 | Clear/colorless |
| 3 | 129 | 9.8 | 10 | 10.5 | Clear/colorless |
| 4 | 286 | 9.0 | 20 | 10.5 | Clear/faint blue |
| 5* | 286 | 8.9 | 21 | 10.5 | Clear/blue |
| 6 | 571 | 6.0 | 64 | 10.5 | First blue gel. After 10 days, blue hazy liquid |
| 7* | 571 | 6.0 | 44 | 10.5 | First blue gel. After 10 days, blue hazy liquid |

TABLE 8a

Fe sol of Bindzil ® 159/500 with different concentrations of $Fe^{3+}$

| Ex. | Conc. ppm | pH before adjustment | # drops of 1M NaOH | pH after adjustment | Appearance/ comments |
|---|---|---|---|---|---|
| 1 | 26 | 9.7 | 10 | 10.4 | Faint haze |
| 2 | 77 | 8.0 | 10 | 10.5 | Clear/yellow |
| 3 | 129 | 6.4 | 12 | 12 | Clear/yellow |
| 4 | 286 | 5.1 | 33 | 10.5 | Clear/yellow |
| 5 | 571 | 3.2 | 0 | — | Milky, viscous, sediment after 24 h |
| 6* | 571 | 3.2 | 0 | — | Milky, viscous, sediment after 24 h |

TABLE 8b

Fe sol of Bindzil ® 15/500 with different concentrations of $Fe^{3+}$

| Ex. | Conc. ppm | pH before adjustment | # drops of 1M NaOH | pH after adjustment | Appearance/ comments |
|---|---|---|---|---|---|
| 1 | 26 | 10.3 | 0 | 10.3 | Clear |
| 2 | 77 | 9.9 | 9 | 10.5 | Clear |
| 3 | 129 | 9.4 | 15 | 10.5 | Faint haze |
| 4 | 286 | 7.2 | 35 | 10.5 | Hazy |
| 5* | 286 | 7.1 | 29 | 10.5 | Faint haze |
| 6 | 571 | 3.1 | 48 | 10.5 | Gel/orange |

TABLE 9a

Cr sol of Bindzil ® 159/500 with different concentrations of $Cr^{3+}$

| Ex. | Conc. ppm | pH before adjustment | # drops of 1M NaOH | pH after adjustment | Appearance/ comments |
|---|---|---|---|---|---|
| 1 | 26 | 9.2 | 13 | 10.5 | Faint haze |
| 2 | 77 | 7.9 | 16 | 10.5 | Haze |
| 3 | 129 | 7.2 | 20 | 10.5 | Clear/greenish |
| 4 | 286 | 5.7 | 34 | 10.5 | Clear/green |
| 5 | 571 | 4.5 | 64 | 10.5 | Turbid/green, sediment after 10 days |
| 6* | 571 | 4.4 | 60 | 10.5 | Turbid/green |

TABLE 9b

Cr sol of Bindzil ® 15/500 with different concentrations of $Cr^{3+}$

| Ex. | Conc. ppm | pH before adjustment | # drops of 1M NaOH | pH after adjustment | Appearance/ comments |
|---|---|---|---|---|---|
| 1 | 26 | 10.3 | 0 | 10.3 | Clear |
| 2 | 77 | 9.9 | 10 | 10.5 | Clear |
| 3 | 129 | 9.4 | 14 | 10.5 | Some haze |
| 4 | 286 | 6.7 | 29 | 10.5 | Haze/green |
| 5 | 571 | 4.9 | 59 | 10.5 | Clear/green |
| 6* | 571 | 5.1 | 60 | 10.5 | Haze/green |

TABLE 10a

Co sol of Bindzil ® 159/500 with different concentrations of $Co^{2+}$

| Ex. | Conc. ppm | pH before adjustment | # drops of 1M NaOH | pH after adjustment | Appearance/ comments |
|---|---|---|---|---|---|
| 1 | 26 | 8.8 | 10 | 10.5 | Clear/colorless |
| 2 | 77 | 8.0 | 10 | 10.5 | Clear/faint lilac |
| 3 | 129 | 6.6 | 14 | 10.5 | Clear/faint lilac |
| 4 | 286 | 6.9 | 26 | 10.5 | Clear/faint lilac |
| 5 | 571 | 7.6 | 40 | 10.5 | Clear/lilac |

TABLE 10b

Co sol of Bindzil ® 15/500 with different concentrations of $Co^{2+}$

| Ex. | Conc. ppm | pH before adjustment | # drops of 1M NaOH | pH after adjustment | Appearance/ comments |
|---|---|---|---|---|---|
| 1 | 26 | 9.9 | 8 | 10.5 | Clear/colorless |
| 2 | 77 | 9.7 | 10 | 10.5 | Clear/faint lilac |
| 3 | 129 | 9.4 | 14 | 10.5 | Clear/faint lilac |
| 4 | 286 | 8.6 | 25 | 10.5 | Clear/lilac |
| 5 | 571 | 7.9 | 40 | 10.5 | Clear/lilac |

TABLE 11a

Gd sol of Bindzil ® 159/500 with different concentrations of $Gd^{3+}$

| Ex. | Conc. ppm | pH before adjustment | # drops of 1M NaOH | pH after adjustment | Appearance/ comments |
|---|---|---|---|---|---|
| 1 | 26 | 9.9 | 6 | 10.5 | Clear colorless |
| 2 | 77 | 9.7 | 11 | 10.5 | Clear colorless |
| 3* | 129 | 9.8 | 9 | 10.5 | Clear colorless |
| 4* | 286 | 8.8 | 15 | 10.5 | Clear colorless |
| 5* | 571 | 9.2 | 23 | 10.5 | Clear colorless |

TABLE 11b

Gd sol of Bindzil ® 15/500 with different concentrations of $Gd^{3+}$

| Ex. | Conc. ppm | pH before adjustment | # drops of 1M NaOH | pH after adjustment | Appearance/ comments |
|---|---|---|---|---|---|
| 1 | 26 | 10.3 | 5 | 10.5 | Clear |
| 2* | 77 | 9.9 | 10 | 10.5 | Clear |
| 3* | 129 | 10.1 | 9 | 10.5 | Clear |
| 4* | 286 | 9.7 | 16 | 10.5 | Clear |
| 5* | 571 | 9.2 | 22 | 10.5 | Faint haze |

TABLE 12a

Mn sol of Bindzil ® 159/500 with different concentrations of $Mn^{2+}$

| Ex. | Conc. ppm | pH before adjustment | # drops of 1M NaOH | pH after adjustment | Appearance/ comments |
|---|---|---|---|---|---|
| 1 | 26 | 9.4 | 21 | 10.5 | Clear |
| 2 | 77 | 8.7 | 24 | 10.6 | Clear |
| 3 | 129 | 8.7 | 28 | 10.5 | Clear |
| 4 | 286 | 8.4 | 36 | 10.5 | Clear/light brown |
| 5 | 571 | 8.7 | 15 | 10.0 | Gel/precipitation |

TABLE 12b

Mn sol of Bindzil ® 15/500 with different concentrations of $Mn^{2+}$

| Ex. | Conc. ppm | pH before adjustment | # drops of 1M NaOH | pH after adjustment | Appearance/ comments |
|---|---|---|---|---|---|
| 1 | 26 | 9.8 | 20 | 10.5 | Clear |
| 2 | 77 | 9.7 | 21 | 10.5 | Clear |
| 3* | 129 | 9.5 | 26 | 10.5 | Clear |
| 4* | 286 | 8.9 | 32 | 10.5 | Clear/light brown |

TABLE 13a

Zn sol of Bindzil ® 159/500 with different concentrations of $Zn^{2+}$

| Ex. | Conc. ppm | pH before adjustment | # drops of 1M NaOH | pH after adjustment | Appearance/ comments |
|---|---|---|---|---|---|
| 1 | 26 | 9.3 | 16 | 10.5 | Clear |
| 2 | 77 | 9.8 | 14 | 10.7 | Clear |
| 3 | 129 | 9.0 | 20 | 10.7 | Clear |
| 4 | 286 | 9.9 | 22 | 10.5 | Clear |
| 5 | 571 | 7.7 | 50 | 10.6 | Clear |

TABLE 13b

Zn sol of Bindzil ® 15/500 with different concentrations of $Zn^{2+}$

| Ex. | Conc. ppm | pH before adjustment | # drops of 1M NaOH | pH after adjustment | Appearance/ comments |
|---|---|---|---|---|---|
| 1 | 26 | 10.1 | 14 | 10.5 | Clear |
| 2 | 77 | 9.9 | 14 | 10.5 | Clear |
| 3 | 129 | 9.8 | 18 | 10.5 | Clear |
| 4 | 286 | 9.2 | 27 | 10.5 | Clear |
| 5 | 571 | 7.4 | 50 | 10.6 | Faint haze |

TABLE 14a

Pb sol of Bindzil ® 159/500 with different concentrations of $Pb^{2+}$

| Ex. | Conc. ppm | pH before adjustment | # drops of 1M NaOH | pH after adjustment | Appearance/ comments |
|---|---|---|---|---|---|
| 1 | 26 | 10.0 | 15 | 10.5 | Clear |
| 2 | 77 | 9.8 | 21 | 10.5 | Clear |
| 3 | 129 | 9.5 | 28 | 10.5 | Clear |
| 4 | 286 | 9.3 | 25 | 10.5 | Clear |
| 5 | 571 | 8.4 | 49 | 10.5 | Clear |

TABLE 14b

Pb sol of Bindzil ® 15/500 with different concentrations of Pb$^{2+}$

| Ex. | Conc. ppm | pH before adjustment | # drops of 1M NaOH | pH after adjustment | Appearance/ comments |
|---|---|---|---|---|---|
| 1 | 26 | 10.2 | 12 | 10.5 | Clear |
| 2 | 77 | 10.1 | 17 | 10.5 | Clear |
| 3 | 129 | 10.0 | 21 | 10.5 | Clear |
| 4 | 286 | 9.8 | 21 | 10.5 | Clear |
| 5 | 571 | 9.6 | 24 | 10.5 | Clear |

The results summarized in Tables 7a to 14b are remarkable, and illustrate the possibility of preparing stable composite sols of silica particles and various multivalent metal ions even at a pH well above pH 10. The very high (in absolute value) Z potentials measured for the multivalent metal ion/silica sol mixtures are astonishing and are indicative of the stability of the composite sols of the invention.

The results in Tables 7a to 14b should be compared with the results in Table 4a-h and 5a-g, which show that, regardless of the type of the metal and even at very low metal concentrations, no aqueous solution of the tested metals is stable against precipitation or flocculation in the higher end of the pH range, viz. the pH range where silica sols generally have high stability.

Tables 7a to 14b, thus show that according to the present invention, composite sols, based on mixtures of silica sols and solutions of multivalent metals, e.g. multivalent transition metals, are obtainable that are stable against precipitation and gelling. As shown in the examples, stable composite sols containing high amounts of metal ions are obtainable by either adding a silica sol to the metal solution and then raising the pH, or by adding the metal solution to the silica sol and then raising the pH, or by raising the pH of the silica sol to a desired basic (high) value, e.g. pH 10.5, and then adding the metal solution to the basified silica sol.

The examples in the tables show that mixtures of unmodified silica sols with metal salt solutions (Tables 7b, 8b, 9b etc.) in many cases were as stable as the corresponding mixtures with sodium aluminate modified sols (Tables 7a, 8a, 9a etc), but also that in some cases silica particles with strongly negatively charged aluminosilicate sites were preferable for optimum stability (Bindzil™ 15/500 is an unmodified silica sol, whereas Bindzil™ 159/500 is a aluminosilicate modified silica sol).

The examples further show that by proper choice of mode of preparation, that is the order in which the selected metal solution, silica sol and pH adjusting agent (e.g. alkali) are added together, mixtures may be provided containing metal concentrations ranging from quite low, for instance lower than 30 ppm metal, which corresponds to less than 0.001 M, to quite high, for instance about 600 ppm or higher, corresponding to 0.02 M metal ion or higher, see example 5 in Tables 1a, 4b, 9a, 9b, 10a, 10b, and 11a. Some examples, for instance example 6 in Table 7a, show that stable composite sols can be prepared with as much as 1200 ppm of metal ion, corresponding to a metal ion concentration of about 0.05 M.

The examples in the below Table 15 show that for a given concentration of metal, for instance 500 ppm Cu and Zn, stable composite sols of different concentrations of 5 nm silica particles can be prepared. The compositions were made by mixing the diluted silica sol into the transition metal solution and then raising the pH of the solution to pH 10 by the dropwise addition of 1 M NaOH.

TABLE 15

Compositions containing 500 ppm Cu or Zn and aluminized 5 nm particles (Bindzil ® 159/500) of varying silica concentration

| Metal | Ex. | Silica conc. % | Comments |
|---|---|---|---|
| Cu | 1 | 5 | Clear |
|  | 2 | 10 | Clear |
|  | 3 | 15 | Clear/faint haze[1] |
| Zn | 4 | 5 | Clear |
|  | 5 | 10 | Clear |
|  | 6 | 15 | Clear/faint haze[1] |

[1] From silica sol

Different composite sols of the invention were prepared containing 500 ppm Zn$^{2+}$ in combination with silica sols of different particle sizes and silica concentrations. In each case, a stable sol was obtained. The faint haze, observed in examples 2 and 3, was due the silica sol and was observable already before admixing the sol with the metal. The sols prepared were as shown in Table 16.

TABLE 16

Compositions containing 500 ppm Zn and silica sols of varying sizes and types

| Example | Particle size (nm) | Silica conc. % | Bindzil ® type | Comments |
|---|---|---|---|---|
| 1 | 5 | 15 | 159/500 | Clear |
| 2 | 7 | 10 | 257/360 | Faint haze[1] |
| 3 | 12 | 5 | 309/220 | Faint haze[1] |

[1] From silica sol

Table 17 shows some further examples of the invention, having metal ion concentrations as high as 2000 ppm, corresponding to 31 mM in the case of Zn.

TABLE 17

Formulations of Bindzil ® 159/500 and 2000 ppm of Zn or Pb and a silica concentration of 3.6% by weight

| Metal | pH before adjustment | Appearance before pH adjustment | 1M NaOH drops | pH after adjustment | Appearance after pH adjustment |
|---|---|---|---|---|---|
| Zn | 8.4 | Clear liquid | 75 | 10.6 | Clear liquid |
| Pb | 7.7 | Clear liquid | 80 | 10.6 | Clear liquid |

Examples of Different Metal Ions Adsorbed on the Particle Surface.

Table 18 shows stable formulations of 5 nm silica particles and aqueous solutions containing two or more metal ions. The formulations were made by adding 50 g of silica sol, diluted to desired concentration of silica, to 20 g of an aqueous solution containing two or more kinds of metal ions under vigorous stirring.

With more two or more different metals, equation (1) can be used to calculate the surface concentration of each metal, $C_{s1}$ and $C_{s2}$, and the total surface concentration of metals, $C_{stot}$:

$$C_{s1} = 60 M_1/(M_{met1} AK) = (60/AK)(M_1/M_{met1})$$

$$C_{s2} = 60 M_2/(M_{met2} AK) = (60/AK)(M_2/M_{met2})$$

$$C_{stot} = C_{s1} + C_{s2} = (60/AK)[M_1/M_{met1} + M_2/M_{met2}].$$

TABLE 18

Stable formulations of silica particles from Bindzil ® 159/500,
Bindzil ® 257/360 and Bindzil ® 309/220
and two types of metal ions with total concentration
of 286 ppm and silica contration of 3.6% by weight.

| Combi-nations | Ex. | Metal weight ratio | Sol type | $C_{s,\,met1}$ atoms per nm² | $C_{s,\,met2}$ atoms per nm² | $C_{s,\,tot}$ atoms per nm² | Comments |
|---|---|---|---|---|---|---|---|
| Cu + Gd | 1 | 2:1 | 159/500 | 0.100 | 0.020 | 0.120 | Clear |
|  | 2 | 1:1 | 159/500 | 0.075 | 0.030 | 0.105 | Clear |
|  | 3 | 1:2 | 159/500 | 0.050 | 0.040 | 0.090 | Clear |
|  | 4 | 2:1 | 257/360 | 0.139 | 0.028 | 0.167 | Clear |
|  | 5 | 2:1 | 309/220 | 0.227 | 0.046 | 0.273 | Clear |
| Cu + Sn | 6 | 2:1 | 159/500 | 0.100 | 0.027 | 0.127 | Clear |
|  | 7 | 1:1 | 159/500 | 0.075 | 0.040 | 0.115 | Some haze |
|  | 8 | 1:2 | 159/500 | 0.050 | 0.054 | 0.104 | Some haze |

With three different metals equation (1) can be used to calculate the surface concentration of each metal, $C_{s1}$, $C_{s2}$ and $C_{s3}$, and the total surface concentration of metals, $C_{stot}$ $$C_{s1} = 60 M_1/(M_{met1} AK) = (60/AK)(M_1/M_{met1})$$

$$C_{s2} = 60 M_2/(M_{met2} AK) = (60/AK)(M_2/M_{met2})$$

$$C_{s3} = 60 M_3/(M_{met3} AK) = (60/AK)(M_3/M_{met3})$$

$$C_{stot} = C_{s1} + C_{s2} + C_{s3} = (60/AK)[M_1/M_{met1} + M_2/M_{met2} + M_3/M_{met3}]$$

TABLE 19

Stable formulations of silica particles from Bindzil ® 159/500, Bindzil ® 257/360,
Bindzil ® 309/220 and Bindzil ® 40/130 and three types of
metal ions with total concentration of 286 ppm and silica contration of 3.6% by weight

| Metals | Metal weight ratio | Bindzil ® type | $C_{s,\,met1}$ atoms per nm² | $C_{s,\,met2}$ atoms per nm² | $C_{s,\,met3}$ atoms per nm² | $C_{s,\,tot}$ atoms per nm² | Comments |
|---|---|---|---|---|---|---|---|
| Cu + Sn + Co | 1:1:1 | 159/500 | 0.050 | 0.027 | 0.054 | 0.131 | Clear |
|  |  | 257/360 | 0.069 | 0.037 | 0.074 | 0.180 | Clear |
|  |  | 309/220 | 0.114 | 0.061 | 0.123 | 0.298 | Haze[1] |
|  |  | 40/130 | 0.192 | 0.103 | 0.207 | 0.502 | Haze[1] |

[1] From silica sol

Mono-metal sols can be blended to give sol mixtures containing particles with a single metal, but different metals, adsorbed on the particles, as is shown in Table 20.

TABLE 20

Mixtures of copper and gadolinium sols and copper and zinc sols
of various ratios. Each sol contains 286 ppm metal before mixing

| Metal sol mixture | Metal sol ratio | pH Comments |
|---|---|---|
| ex. 4, table 7a copper sol + ex. 4, table 11a, gadolinium sol | 2:1 | 9.8 Clear, colorless |
|  | 1:1 | 9.7 Clear, colorless |
|  | 1:2 | 9.8 Clear, colorless |
| ex. 4, table 7a, copper sol + ex. 4, table 13a, zinc sol | 2:1 | 9.9 Clear, colorless |
|  | 1:1 | 9.9 Clear, colorless |
|  | 1:2 | 9.9 Clear, colorless |

Examples Showing Z-Potential of the Composite Sols of the Invention

The Z-potentials of different copper or zinc containing sols were measured, at the pH and concentrations at which they were prepared, see Tables 7a, 7b, 14 and 15. As a comparison, the Z-potentials of some silica sols were also measured. The results are shown in Tables 21a and 21b.

TABLE 21a

Zeta potential measured in various composite sols of the invention

| Sample | Example | Metal conc. ppm | $C_{s,\,met1}$ atoms per nm² | Zeta potential mV |
|---|---|---|---|---|
| 1 | #1, Table 7a | Cu, 26 | 0.014 | −55.0 |
| 2 | #3, Table 7a | Cu, 129 | 0.067 | −47.0 |
| 3 | #5, Table 7a | Cu, 571 | 0.300 | −54.9 |
| 4 | #6, Table 7b | Cu, 571 | 0.300 | −50.1 |
| 5 | #6, Table 7a | Cu, 1286 | 0.675 | −46.1 |
| 6 | #1, Table 16 | Zn, 500 | 0.061 | −36.7 |
| 7 | #2, Table 16 | Zn, 500 | 0.127 | −43.2 |
| 8 | #3, Table 16 | Zn, 500 | 0.417 | −45.4 |
| 9 | #3, Table 15 | Cu, 500 | 0.063 | −45.1 |

TABLE 21b

Zeta potential measured in silica sols

| Sample | Silica sol | Zeta potential mV |
|---|---|---|
| 1 | Bindzil ® 15/500 | −49.3 |
| 2 | Bindzil ® 159/500 | −46.8 |
| 3 | Bindzil ® 159/50, 10% SiO₂ | −56.1 |
| 4 | Bindzil ® 159/50, 15% SiO₂ | −45.1 |
| 5 | Bindzil ® 257/360, 10% SiO₂ | −44.1 |
| 6 | Bindzil ® 309/220, 15% SiO₂ | −45.3 |
| 7 | Bindzil ® 40/130 | −32.8 |

The absolute values of the Z-potentials of the composite sols of the invention are remarkably high even at the highest metal concentration, 1286 ppm, which indicates high stability towards flocculation or gelling.

Example Showing Blocidal Function of Preparations

In this example the following solutions/materials were used:
1. Deionized water
2. Solution CuCl₂.2H₂O in deionized water, 571 ppm Cu
3. Solution CuCl₂.2H₂O in deionized water, 1286 ppm Cu
4. Cu containing sol of example 5 in Table 7a, 571 ppm Cu
5. Cu containing sol of example 6 in Table 7a, 1286 ppm Cu Slices of French bread from a local baker were used as substrates for fungal growth. The bread slices were as brushed on all sides with solutions 1-5. The bread slices on dinner plates were put in plastic bags (one slice on a plate to a bag), which were in a dark, closed room where the temperature varied between 18 and 20° C. over the day. After 14 days, the untreated bread slice was severely befouled and the slice seemed to be completely invaded by fungi.

Treatment with Cu solution or Cu containing sol was effective and the effect increased with the copper content. Only little fungal growth could be seen in the slice treated with Cu solution containing 1286 ppm Cu and even less growth could be seen in the slice treated with the sol containing 1286 ppm Cu.

The invention claimed is:

1. A stable composite sol comprising an aqueous colloidal dispersion of particles of silica having a particle size of from 3 nm to 100 nm, said particles having multivalent ions of one or more metals adsorbed at the particle surface, selected from metals having atomic numbers 24-31, 42-46, 48-50, 64 and 74-82, wherein said multivalent ions are present at a total concentration of from 0.05 mM to 50 mM, and wherein the dispersion has a pH of from 8 to 11.

2. The stable composite sol according to claim 1, wherein said ions are present at the surface in an amount of 0.0005-5 ions per $nm^2$ of silica particle surface.

3. The stable composite sol according to claim 1, wherein the surface of the particles of silica contains aluminosilicate sites.

4. The stable composite sol according to claim 1, wherein said particles of silica are present at a concentration of from 0.001% by weight to 25% by weight of the dispersion.

5. The stable composite sol according to claim 1, wherein said particles of silica are present at a concentration of from 0.1% by weight to 15% by weight of the dispersion.

6. The stable composite sol according to claim 1, wherein the one or more metals are selected from metals having atomic numbers 24-31, 42-46, 48, 49 and 74-81.

7. The stable composite sol according to claim 1, wherein the one or more metals are selected from metals having atomic numbers 24-30, 42-46, 48 and 74-80.

8. The stable composite sol according to claim 1, wherein at least one of said metals is selected from Cr, Fe, Co, Cu, Zn, Sn, Gd, and Pb.

9. A process for preparing a stable composite sol according to claim 1, wherein said method comprises admixing an aqueous silica sol and one or more aqueous solutions of one or more metal salts, wherein each of said metal salts the metal is selected from metals having atomic numbers 24-31, 42-46, 48-50, 64 and 74-82.

10. The process according to claim 9, wherein a pH adjusting agent is added to the silica sol either before or after admixing said sol with metal solution(s).

11. The process according to claim 9, wherein at least some of said silica particles have aluminosilicate sites at the particle surface.

12. The stable composite sol according to claim 1, wherein said ions of one or more metals adsorbed at the particle surface are selected from ions of Cr, Fe, Co, Cu, Zn, Sn, Gd, and Pb.

13. The stable composite sol according to claim 1, wherein said ions of one or more metals adsorbed at the particle surface are selected from ions of Fe, Cu, and Zn.

14. The stable composite sol according to claim 1, wherein said multivalent ions are present at a total concentration of from 0.1 mM to 40 mM.

15. The stable composite sol according to claim 1, wherein said multivalent ions are present at a total concentration of from 0.5 mM to 30 mM.

16. The stable composite sol according to claim 1, wherein said multivalent ions are present at a total concentration of from 1 mM to 10 mM.

* * * * *